(12) United States Patent
Aleksic et al.

(10) Patent No.: US 8,346,456 B2
(45) Date of Patent: Jan. 1, 2013

(54) METHOD AND APPARATUS FOR CONTROLLING TRAVELING SPEED OF A VEHICLE

(75) Inventors: Mario Aleksic, Stuttgart (DE); Mike Benowitz, Lake Oswego, OR (US); Bernd Martin, Hochdorf (DE); Joseph Michalek, Redford Township, MI (US); Thomas Passegger, Metzingen (DE)

(73) Assignee: Daimler AG, Stuttgart (DE)

( * ) Notice: Subject to any disclaimer, the term of this patent is extended or adjusted under 35 U.S.C. 154(b) by 791 days.

(21) Appl. No.: 12/482,150

(22) Filed: Jun. 10, 2009

(65) Prior Publication Data

US 2010/0318273 A1    Dec. 16, 2010

(51) Int. Cl.
*G06F 7/00* (2006.01)
*G06F 17/00* (2006.01)

(52) U.S. Cl. ............... 701/98; 701/25; 701/56; 701/65; 701/93; 701/96

(58) Field of Classification Search ............ 701/25, 701/56, 65, 93, 96, 98
See application file for complete search history.

(56) References Cited

U.S. PATENT DOCUMENTS

| | | | | |
|---|---|---|---|---|
| 5,832,400 A | * | 11/1998 | Takahashi et al. | 701/53 |
| 6,070,118 A | * | 5/2000 | Ohta et al. | 701/65 |
| 6,990,401 B2 | * | 1/2006 | Neiss et al. | 701/96 |
| 2008/0022969 A1 | * | 1/2008 | Frenz et al. | 123/347 |
| 2008/0306669 A1 | * | 12/2008 | Wang et al. | 701/93 |
| 2009/0118952 A1 | * | 5/2009 | Heap et al. | 701/56 |

FOREIGN PATENT DOCUMENTS

DE      103 45 319 A1    6/2004

\* cited by examiner

*Primary Examiner* — Khoi Tran
*Assistant Examiner* — Jorge Peche
(74) *Attorney, Agent, or Firm* — Crowell & Moring LLP

(57) ABSTRACT

In a method for controlling the driving speed of a vehicle that has a speed control device into which a set speed can be entered as driver command, a reference variable of the speed control device is varied within a specified or specifiable speed range of the set speed, based on an evaluation of a section of the road ahead of the driver and maintaining a minimum fuel usage in a first operating mode of the speed control device. To enable a better control of the driving speed, the method includes steps of i) detecting a change of the set speed; ii) changing over from the first operating mode to a second operating mode of the speed control device when a change of the set speed has been detected; iii) determining the reference variable in the second operating mode based on the change in such a manner that a tuning of the speed control device to a higher driving speed takes place with an increase of the set speed resulting from the change, and a tuning process of the speed control device to a lower driving speed takes place with a decrease of the set speed resulting from the change; and iv) changing back from the second operating mode to the first operating mode, if an interruption criterion is fulfilled.

9 Claims, 2 Drawing Sheets

(State of the art)

METHOD AND APPARATUS FOR CONTROLLING TRAVELING SPEED OF A VEHICLE

BACKGROUND AND SUMMARY OF THE INVENTION

The invention relates to a method and apparatus for controlling the driving speed of a vehicle by entering a set speed into a control unit as a driver command. In a first operating mode of the speed control device, a reference variable of the speed control unit is varied within a specified (or specifiable) speed environment (that is, a range) of the set speed, depending on an evaluation a section of road ahead of the vehicle, and on maintaining a state of the vehicle which achieves a minimum fuel usage.

Methods for controlling the driving speed of a vehicle are known. The speed control device can be designed as a master controller, in which a target value (which can be changed over time) can be provided as reference variable. The reference variable can thus be varied within the speed environment of the set speed, so that a fuel usage of the vehicle is as low as possible results.

German patent document DE 103 45 319 A1 discloses a predictive speed control for a motor vehicle, which uses information relating to the current vehicle position and also the ground ahead to save fuel and to increase traveling comfort. A vehicle operating cost function is defined on the basis of environment parameters, vehicle parameters, vehicle operating parameters and road section parameters. Vehicle control parameters are calculated and stored, which minimize the vehicle operation cost function. Current vehicle operation is controlled based on the optimized vehicle control parameters.

One object of the invention is to provide an improved speed control device for a vehicle, and especially to provide an improved operability of such a speed control device.

This and other objects and advantages are achieved by the method and apparatus according to the invention, which provides a speed control device—also known as cruise control or cruise control regulator—into which a set speed can be entered as driver command. In a first operating mode of the speed control device, a reference value entered therein is varied within a specified (or specifiable) speed environment of the set speed, based on an evaluation of a section of road ahead of the vehicle and based on maintaining a state of the vehicle with regard to achieving a fuel usage as low as possible. The method according to the invention includes the following steps: detecting a change of the set speed; changing over from the first operating mode to a second operating mode of the speed control device when the change of the set speed is detected; determining the reference variable in the second operating mode depending on the change in such a manner that the speed control device is tuned to a higher driving speed with an increase of the set speed resulting from the change, and to a lower driving speed with a decrease of the set speed resulting from the change; and changing back from the second operating mode to the first operating mode if an interruption criterion is fulfilled.

The tuning process towards the higher or lower driving speed can advantageously be perceived by the driver, who has either increased or decreased the set speed as a driver command. After the change of the set speed, the speed control device advantageously behaves for the driver of the vehicle in a tangible manner that is the same as (or similar to) a speed control device where the reference variable (in the sense of a setpoint) is always set to the set speed. Advantageously, the driver can be signaled by means of the tuning process that the speed control device has registered the new set speed, so that an optical and/or acoustic display unit for symbolizing the set speed can advantageously be dispensed with.

After the feedback to the driver by means of the tuning process, the system can advantageously change back to the usage-optimal first operating mode, in which the reference variable is varied to achieve a minimal fuel usage. For this purpose, the interruption criterion can advantageously be checked, and, if it is fulfilled, the system can change back again to the first operating mode. The speed control device can be operated in a simpler and more intuitive manner by means of the feedback, where inadvertent multiple inputs can for example be avoided due to the feedback. The reference variable can be generated by means of a suitable device with regard to minimum usage, and the speed control device in the form of a master controller.

The following steps are provided in one embodiment of the method according to the invention: determining a difference value of the change of the set speed, determining an actual value of the reference variable at the time when the change occurs, and, setting the reference variable to a sum of the actual value of the reference variable and the difference value of the change. The difference value of the change of the set speed can take on both positive and negative values, it being positive with an increase of the set speed and negative with a decrease of the set speed. The currently existing reference variable (that is, the actual value of the reference variable) can advantageously be determined. The actual value of the reference variable issued at the time of the change can advantageously be increased or decreased by exactly the amount that the driver enters by means of a change of the set speed as a driver command. The tuning process thereby advantageously takes place in the second operating mode by exactly this amount, just as the driver is used to from a conventional speed control device with a setpoint jump. The driver can thus experience the feedback in a particularly concise manner, and know that the change of the set speed was successful.

The following step is provided in another embodiment of the method: setting the reference variable to the sum of the actual value of the driving speed at the change and the difference value of the change. A control deviation can result due to a reference behavior of the speed control device or due to outside influences (e.g., wind). The driver can advantageously be provided with a tuning process as feedback, starting with the current driving speed (that is, the actual value of the driving speed). The tuning process experienced by the driver as feedback is thus more similar to the one after a constant drive (that is, a target value jump with a tuned state of the speed control device) and can thus advantageously provide an even better and more intuitive feedback of the change of the set speed.

In a further embodiment of the method, the system changes back to the first operating mode as soon as a period of the interruption criterion has elapsed. The period can advantageously be chosen in such a manner that the driver experiences a sufficient feedback regarding his change of the set speed. It is possible, for example, to choose the period such that the tuning process known to the driver as such from conventional speed control devices is predominantly finished.

In a further embodiment of the method according to the invention, the following step is provided: changing back to the first operating mode as soon as a control deviation of the interruption criterion (15) falls below a threshold. Advantageously, the extent to which the tuning process has progressed can thus be determined by means of the interruption criterion. The threshold for the control deviation can advantageously be chosen so as to ensure that the tuning process is terminated; that is, the driver has noticed it certainly also as feedback.

In a further embodiment of the method according to the invention, the following steps are provided: switching from the second operating mode to a third operating mode as soon as the interruption criterion is fulfilled; calculating a target value of the reference variable at the interruption criterion which corresponds to the first operating mode; determining the actual value of the reference variable at the interruption criterion, and bringing the reference variable from the actual value of the reference variable to the target value of the reference variable at the third operating mode; and changing from the third operating mode to the first operating mode after the approach.

A sudden change of the reference variable—which would be seen by the driver as a further tuning process in an annoying manner—can advantageously be prevented during the changeover from the second operating mode to the first operating mode. The third operating mode can advantageously be interposed until the reference variable is brought up to the target value of the reference variable. The target value of the reference variable can thereby be calculated by the corresponding device in such a manner, as if the speed control device would be in the first operating mode. Indeed, another reference variable is supplied to the speed control device, which lies between the actual value of the reference variable determined at the change and the target value of the reference variable. An approach in this context can mean a steady progress, for example a monotonously increasing or monotonously decreasing progress, which is actually the reference variable passed on to the speed control device during the third operating mode.

With a speed control device for the predictive control of the driving speed of a vehicle depending on a set speed which can be provided and on a distance profile of a section of road ahead of the vehicle, the object is further solved in that the speed control device is arranged to modify the driving speed in response to a sudden change of the set speed aligned with the change of the set speed, preferably by the same amount of change, and to regulate it temporarily to a constant speed level. The variation of the driving speed, otherwise dependent on the distance profile, is disabled temporarily by the temporary control to the constant speed level.

The distance profile of the section of road ahead of the vehicle, especially its elevation and/or the curvature profile, is determined in a predictive manner by a positioning determining system supported by satellite and a digital map.

The invention also provides a motor vehicle having a speed control device for controlling a driving speed of the vehicle. The speed control device is designed, arranged and/or constructed for carrying out a method described previously. The previously described advantages result.

Other objects, advantages and novel features of the present invention will become apparent from the following detailed description of the invention when considered in conjunction with the accompanying drawings.

DETAILED DESCRIPTION OF THE DRAWINGS

Figure 1:
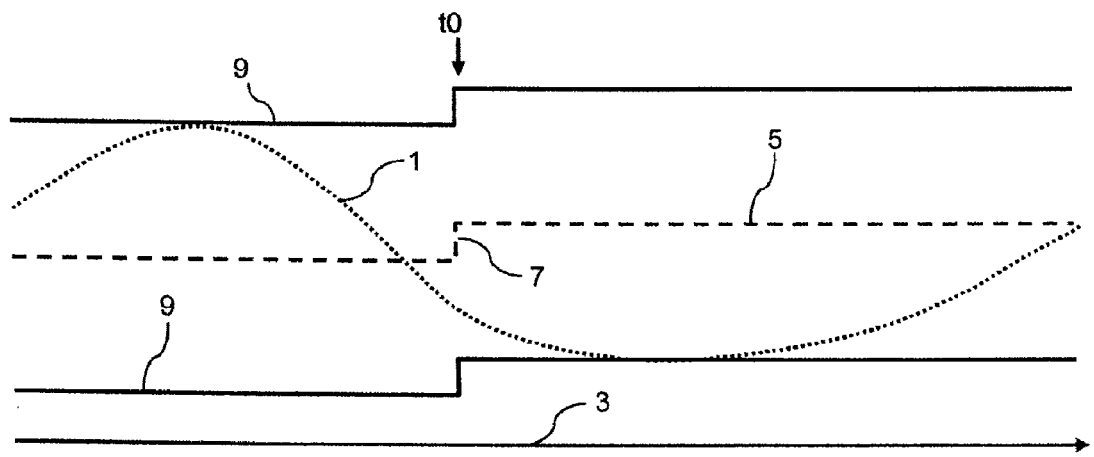
FIG. 1 illustrates the progress of a set speed and a reference variable of a speed control device of a vehicle varied over time within a speed environment of the set speed, as known from the state of the art.

FIG. 1 shows a diagram of a reference variable 1 of a speed control device according to the state of the art (not shown in detail), with time plotted on the x-axis 3. The reference variable 1 is a setpoint which is variable over the time within presettable limits of the speed control device (not shown). The change over time is achieved based on a distance profile of a section of road ahead of the vehicle, especially on the elevation and/or curvature profile, in such a manner that fuel usage is minimized. The distance profile can be determined by means of a satellite-supported position determining system, for example a navigation system based on GPS (global positioning system), and with digital map data. Such an operating mode where the fuel usage is kept as low as possible by a specific variation of the reference variable 1 is called the first or usage-optimized operating mode in the following.

FIG. 1 shows the progress of a set speed 5, which has a change 7 in the form of a jump at a time t0. The set speed 5 thereby corresponds to a desired speed entered by the driver via corresponding input means. The set speed 5 increases at the change 7 due to a driver input at the time t0.

A speed environment (range) 9 of the set speed 5 is also shown in FIG. 1. The mathematical definition of the "speed environment" can be seen, for example, as an interval surrounding the set speed 5 in the sense of a speed band. Although the latter may be asymmetric, an interval for the speed environment having the same size upwards and downwards is shown, where the speed environment 9 also experiences the change 7; that is, it increases suddenly at the change 7 by the same amount as the set speed 5. It can be seen that the reference variable 1 is varied within the speed environment 9.

As can also be seen, the reference variable 1 decreases further despite the change 7 (that is, the increase of the set speed 5), thus having a negative incline. This can be sensible with regard to achieving a minimum fuel usage. However, as a result, the driver of the vehicle detects that the driving speed of the vehicle, which is updated by means of the speed control device of the reference variable 1, decreases despite his driver demand for an increase of the driving speed (that is, the change 7 of the set speed 5 upwards). The speed change perceived by the driver thus contradicts his change command, so that the driver has the erroneous impression that the speed control device has not adopted his desired change 7 of the set speed 5.

In order to prevent this wrong impression, it is necessary to give the driver a feedback regarding the change of the set speed 5 via a display device provided in the vehicle. It is disadvantageous, however, that the driver has to avert his attention temporarily from the traffic and to direct it towards the display device, if he wants to ensure if the speed control device has adopted the change 7 of the set speed 5.

Figure 2:
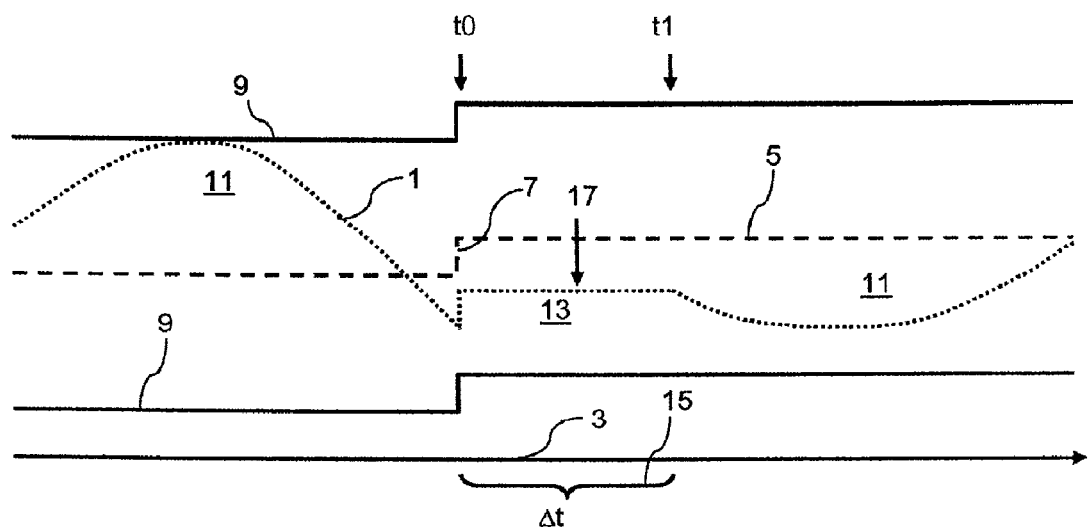
FIG. 2 is a graphic depiction similar to FIG. 1, for a speed control device according to the invention, where a driver of the vehicle has increased the set speed.
Figure 3:
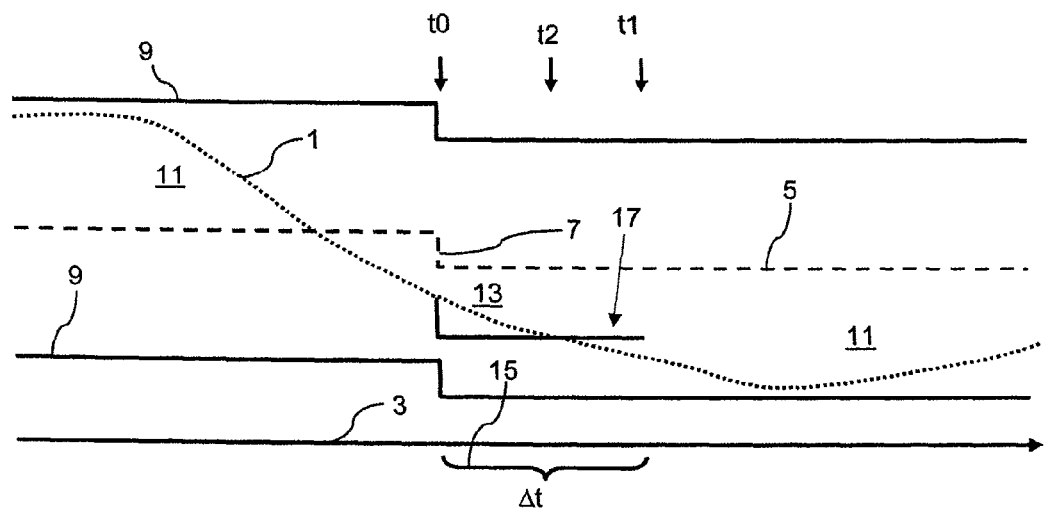
FIG. 3 is a graph which corresponds to FIG. 2, where a decrease of the set speed has taken place and the reference variable has a negative incline at a change of the set speed.
Figure 4:
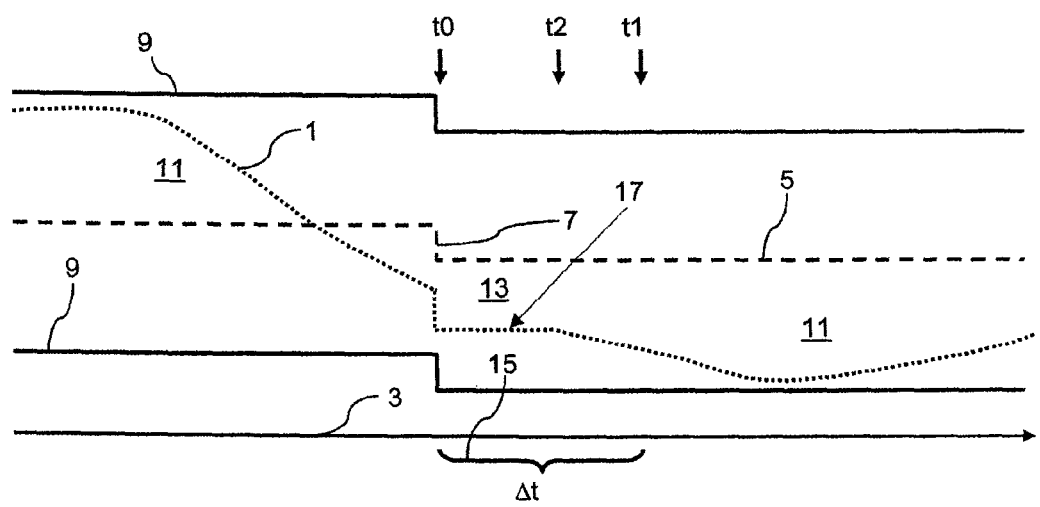
FIG. 4 is a graph of the reference variable resulting from FIG. 3.

With the speed control device according to the invention, the driver obtains the desired feedback by a tangible change of the operating mode of the speed control device, as is explained in more detail by means of the following FIGS. 2-4. A display device for displaying the set speed 5 is therefore unnecessary, and the driver does not have to divert his attention to such a display device to obtain feedback regarding the change 7 of the set speed 5.

FIG. 2 shows the situation shown in FIG. 1, except that in contrast, the reference variable 1 of the speed control device according to the invention is varied noticeably within the speed environment 9 of the set speed 5 as a reaction to the change 7. That is, it can be seen that the reference variable 1 also undergoes a change concurrently with the change 7, which corresponds to the change of the set speed 5. Accordingly, a sudden change also takes place synchronously (or at least virtually synchronously) with the change 7 of the set speed 5; that is the reference variable 1 also increases. As can be seen in FIG. 2, the reference variable 1 is changed by the same amount as the set speed 5. A tuning or adjusting process of the actually driven speed of the vehicle (not shown), advantageously takes place after the change of the reference variable 1, which can advantageously be perceived by the driver of the vehicle as functional feedback to his change of the set speed 5.

The reference variable 1 is kept constant during the tuning process, in which the speed control device is operated in a second operating mode 13, which corresponds generally to the operating mode of a conventional speed control device, where the reference variable 1 depends only on the set speed 5, generally corresponds exactly to this. However, as can be seen in FIG. 2, in the system according to the invention this is not the case; rather, the reference variable 1 is changed suddenly starting from its current level at the time t0, and is then maintained at the changed level 17 up to time t1, so that the advantageously perceivable tuning process is adjusted to this speed level. On the right and left of the constant reference variable 1 (that is, before the time t0 and after the time t1) the reference variable 1 is varied in such a manner that fuel usage is minimized, which corresponds to the previously explained first operating mode 11 of the speed control device. The changeover from the first operating mode 11 to the second operating mode 13 is initiated by the change 7 of the set speed 5, so that the driver obtains the desired feedback during the second operating mode 13, that is, in the period between the two times t0, t1.

For a transfer from the second operating mode 13 to the first operating mode 11, (that is, changing back to the first operating mode 11), an interruption criterion 15 for the second operating mode 13 is schematically shown in FIG. 2, indicated by a curved bracket. Presently, the interruption criterion 15 is a time interval $\Delta t$ related to the change 7; that is, the interruption criterion 15 is fulfilled if a time corresponding to the time interval $\Delta t$ (starting at the change 7 of the set speed 15) has elapsed. In FIG. 2, this is the case at the time t1. At this time, the system changes back from the second operating mode 13 to the first operating mode 11, so that thereafter the reference variable 1 again experiences a variation conducted corresponding to usage criteria.

The interruption criterion 15 can however also have other parameters, for example a control deviation (not shown), or a comparison of such a control deviation with a threshold, where the system changes back from the second operating mode 13 to the first operating mode 11 as soon as the control deviation falls below the threshold. It is also possible to provide both the time interval and the control deviation simultaneously as the interruption criterion 15, so that the system changes back when one of the criteria is satisfied. Alternatively and/or additionally it is possible to check both criteria and to change back only when both are fulfilled.

FIG. 4 is similar to FIG. 2, except that the change 7 of the set speed 5 has a negative value; that is in contrast to FIG. 2, the set speed 5 is reduced. It can be seen that the reference variable 1 also experiences a sudden change here, which corresponds, in both direction and amount, to the change 7 of the set speed 5. A tuning process to a lower actual speed advantageously also takes place here, which can be sensed as familiar by the driver, and which gives a functional feedback.

Similar to FIG. 2, a changeover from the first operating mode 11 to the second operating mode also takes place at the time t0, where the reference variable 1 also has a negative incline. In contrast to FIG. 2, however, the change back to the first operating mode 11 occurs not after the elapse of the time interval $\Delta t$, but in fact earlier at a time t2, which before the time t1. The reference variable 1 is reduced further from the time t2, which does not disagree with the driver command of a slower drive. The earlier change back to the usage-optimized first operating mode 11 compared to FIG. 2 therefore does not conflict with the driver demand, and results in an altogether more usage-beneficial driving mode due to the shortening of the usage-disadvantageous second operating mode 13, where the driver simultaneously obtains a feedback regarding the change of the set speed 5 via taking off the driving speed corrected by the reference variable 1.

FIG. 3 shows how the progress of the reference variable 1 shown in FIG. 4 is determined. FIG. 3 essentially corresponds to the depiction of FIG. 4, where the dotted line shows the progress of a first setpoint, which corresponds to the reference variable 1, if it would be varied continuously during the entire period; that is, also after the change 7, corresponding to the usage-optimized first operating mode 11. The cascaded curve with the constant level 17 shows the progress of a second setpoint which corresponds to the reference variable 1, if it would be determined analogously to FIG. 2 according to the second operating mode 13, and thus would experience an aligned change with the same amount as a reaction to the change 7 of the set speed 5 at the time t0, and subsequently would be kept constant at the level 14 up to the expiration of the time interval $\Delta t$, (that is, the time t1). The progress of the dotted reference variable 1 in FIG. 4 then corresponds to the minimum between the first and the second setpoint. That is, the reference variable 1 corresponds to the first setpoint up to time t0, and is thereby varied according to the first operating mode 11 up to time t0. At the time t0, a changeover to the second operating mode 13 takes place, where the reference variable 1 is initially lowered by an amount corresponding to the change 7 to the second setpoint, and is then kept constant at this lowered level 17. At the time t2, the first setpoint determined continuously in the background falls below the reference variable 1 still kept constant at the lowered level 17, and the system then changes back to the first operating mode 11, where the reference variable 1 is again varied in such a manner that a fuel usage as low as possible is achieved.

As carried out above, the reference variable 1 in the second operating mode 13 is generated by forming the minimum from the first and second setpoints. But this is only valid in the case of a decrease of the set speed 5. Analogous to this approach, the reference variable 1 during an increase of the set speed 5 is advantageously generated by forming the maximum between the first setpoint and the suddenly increasing second setpoint corresponding to the change of the set speed 5.

With the diagram according to FIGS. 1 to 4, this can be a situation where the speed control device decreases the reference variable 1, and increases it again to drive over a crest while saving as much energy as possible.

The period $\Delta t$, as an interruption criterion 15, is chosen so that the actual driving speed can reach the target speed 17 under normal circumstances, that is, with ascensions not to high and/or weather influences, so as to signal the driver the amount of the set speed change.

In a further development of the method, the higher the change of the set speed, the longer this process will last. The period Δt is thus adjusted correspondingly. The larger the amount of the change 7, the longer the period Δt is chosen. An acceleration of the vehicle takes longer on inclines than in a plane.

In a further development of the method, the greater the current incline of the road surface, the longer the period Δt is chosen after an increase of the set speed 5. A reduction of the speed is correspondingly faster with inclines compared to the plane, so that the period Δt is then reduced. This is exactly reversed with declines. Acceleration is faster, the period Δt is reduced, and deceleration lasts longer, the period Δt is increased.

With an increasing road surface, after an increase of the set speed 5, the larger the current incline of the road surface, the longer the period Δt is chosen. With an increasing road surface, after a reduction of the set speed 5, the larger the current incline of the road surface, the smaller the period Δt is chosen. With a decline, after an increase of the set speed 5, the larger the current decline of the road surface, the smaller the period Δt is chosen; with a decline after a reduction of the set speed 5, the larger the current decline of the road surface, the longer the period Δt is chosen.

In a further development of the method according to the invention, the higher the vehicle mass, the longer the period Δt is chosen, as thereby acceleration and deceleration will thereby last longer. The higher the vehicle mass, the higher the period Δt is chosen.

In a further development of the method, the driving speed during the changeover from the first operating mode 11 to the second operating mode 13 is gradually brought up to the constant speed level 17 to be adjusted in the second operating mode 13, so as to avoid sudden acceleration or deceleration. After changing the set speed 5 by a certain amount, the vehicle is brought to the speed level 17 with a given acceleration/deceleration. A preferred embodiment of the gradual approach to the speed level 17 is a low pass filter.

In a further development of the method, the changeover from the second operating mode 13 to the first operating mode 11 takes place via a third operating mode. The reference variable 1 is thereby gradually brought up from the constant level 17 adjusted in the second operating mode 13 to the progress of the reference variable 1 which has to be adjusted according to the first operating mode 11 for achieving a fuel usage as low as possible, when the interruption criterion 13 is fulfilled, especially after the elapse of the time interval Δt in the third operating mode. A soft transfer from the constant driving speed adjusted in the second operating mode 13 to the driving speed to be adjusted in the first operating mode 11 is created thereby.

The vehicle can be a motor vehicle, an automobile, preferably a truck, a bus or any other vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for controlling the driving speed of a vehicle having a speed control device, said method comprising:
   determining a set speed, using a control unit, corresponding to a desired speed entered by a driver via an input device;
   varying a reference variable of the speed control device, using the control unit, within a specified or specifiable range of the set speed, based on an evaluation of a section of the road ahead of the driver using a roadway profile, and based on maintaining a state of the vehicle with a fuel usage that is as low as possible, in a first operating mode of the speed control device;
   detecting a change of the set speed, using the control unit, due to a driver input at a predetermine time;
   changing over from the first operating mode to a second operating mode of the speed control device, using the control unit, when a change of the set speed has been detected;
   wherein said first operation mode is designed to minimized fuel usage and said second operating mode is designed to provide the driver with feedback corresponding to said change in the set speed;
   in the second operating mode adjusting the reference variable based on the change, in such a manner that the speed control device is tuned, due to the driver input at a predetermined time, to a higher driving speed in the case of an increase of the set speed resulting from the change, and to a lower driving speed in the case of a decrease of the set speed resulting from the change so the driver obtains adequate feedback that the speed was successfully set; and
   changing back from the second operating mode to the first operating mode when an interruption criterion is satisfied, wherein said interruption criterion is related to the change of the set speed or a control deviation with a threshold.

2. The method according to the claim 1, further comprising:
   determining a difference value of the change of the set speed;
   determining an actual value of a reference variable at the change; and
   setting the reference variable to a sum of the actual value of the reference variable and the difference value of the change.

3. The method according to claim 1, further comprising:
   setting the reference variable to a sum of the actual value of the driving speed that exists at the change and the difference value of the change.

4. The method according to claim 1, further comprising:
   changing back to the first operating mode as soon as a period of the interruption criterion has elapsed.

5. The method according to claim 1, further comprising:
   changing back to the first operating mode as soon as a control deviation of the interruption criterion falls below a threshold value.

6. The method according to claim 1, further comprising:
   switching from the second operating mode to a third operating mode as soon as the interruption criterion is fulfilled;
   calculating a target value of the reference variable at the interruption criterion corresponding to the first operating mode;
   determining an actual value of the reference variable at the interruption criterion;
   bringing the reference variable from the actual value up to the target value of the reference variable in the third operating mode; and
   changing from the third operating mode to the first operating mode after the approach.

7. A speed control device for the predictive control of the driving speed of a vehicle based on a set speed specified by a driver and based on a distance profile of a section of road ahead of the vehicle, the speed control device comprising:

a control unit configured to determine a set speed corresponding to a desired speed entered by a driver via an input device;

vary a reference variable of the speed control device within a specified or specifiable range of the set speed, based on an evaluation of a section of the road ahead of the driver using roadway profile, and based on maintaining a state of the vehicle with a fuel usage that is as low as possible, in a first operating mode of the speed control device;

detect a change of the set speed due to a driver input at a predetermine time;

change over from the first operating mode to a second operating mode of the speed control device when a change of the set speed has been detected, wherein said first operation mode is designed to minimized fuel usage and said second operating mode is designed to provide the driver with feedback corresponding to said change in the set speed;

in the second operating mode, adjusting the reference variable based on the change, in such a manner that the speed control device is tuned, due to the driver input at a predetermined time, to a higher driving speed in the case of an increase of the set speed resulting from the change, and to a lower driving speed in the case of a decrease of the set speed resulting from the change so the driver obtains adequate feedback that the speed was successfully set; and change back from the second operating mode to the first operating mode when an interruption criterion is satisfied, wherein said interruption criterion is related to the change of the set speed or a control deviation with a threshold, and wherein the speed control device is configured to modify the driving speed of the vehicle in response to a sudden change of the set speed, aligned with the change of the set speed, and to regulate it temporarily to a constant speed level.

8. The speed control device according to claim 7, wherein a distance profile of the section of the road ahead of the vehicle is determined in a predictive manner by means of a satellite-supported position determination system and a digital map.

9. A vehicle having a speed control device for controlling a driving speed of the vehicle, the speed control device comprising:

a control unit configured to determine a set speed corresponding to a desired speed entered by a driver via an input device;

vary a reference variable of the speed control device within a specified or specifiable range of the set speed, based on an evaluation of a section of the road ahead of the driver using roadway profile, and based on maintaining a state of the vehicle with a fuel usage that is as low as possible, in a first operating mode of the speed control device;

detect a change of the set speed due to a driver input at a predetermine time;

change over from the first operating mode to a second operating mode of the speed control device when a change of the set speed has been detected, wherein said first operation mode is designed to minimized fuel usage and said second operating mode is designed to provide the driver with feedback corresponding to said change in the set speed;

in the second operating mode, adjusting the reference variable based on the change, in such a manner that the speed control device is tuned, due to the driver input at a predetermined time, to a higher driving speed in the case of an increase of the set speed resulting from the change, and to a lower driving speed in the case of a decrease of the set speed resulting from the change so the driver obtains adequate feedback that the speed was successfully set; and change back from the second operating mode to the first operating mode when an interruption criterion is satisfied, wherein said interruption criterion is related to the change of the set speed or a control deviation with a threshold, and wherein the speed control device is configured to modify the driving speed of the vehicle in response to a sudden change of the set speed, aligned with the change of the set speed, and to regulate it temporarily to a constant speed level.

* * * * *